(12) United States Patent
Bowden-Peters

(10) Patent No.: US 10,495,412 B2
(45) Date of Patent: Dec. 3, 2019

(54) CARRYING A MUNITION ON A MUNITION LAUNCHER PLATFORM

(71) Applicant: MBDA UK LIMITED, Hertfordshire (GB)

(72) Inventor: Edwin John William Bowden-Peters, Hertfordshire (GB)

(73) Assignee: MBDA UK LIMITED, Hertfordshire (GB)

( * ) Notice: Subject to any disclaimer, the term of this patent is extended or adjusted under 35 U.S.C. 154(b) by 8 days.

(21) Appl. No.: 15/576,541

(22) PCT Filed: May 20, 2016

(86) PCT No.: PCT/GB2016/051468
§ 371 (c)(1),
(2) Date: Nov. 22, 2017

(87) PCT Pub. No.: WO2016/189283
PCT Pub. Date: Dec. 1, 2016

(65) Prior Publication Data
US 2018/0156571 A1    Jun. 7, 2018

(30) Foreign Application Priority Data

May 22, 2015    (GB) .................................. 1509185.3

(51) Int. Cl.
*F41F 3/04* (2006.01)
*B64D 7/08* (2006.01)
(Continued)

(52) U.S. Cl.
CPC .................. *F41F 3/04* (2013.01); *B64D 7/08* (2013.01); *F41F 3/065* (2013.01); *G05B 19/12* (2013.01);
(Continued)

(58) Field of Classification Search
CPC ........... G06K 7/10297; G06K 7/10425; G06K 17/0022; G05B 19/12
(Continued)

(56) References Cited

U.S. PATENT DOCUMENTS 6,085,629 A * 7/2000 Thiesen .................... F41G 3/04
                                                    89/41.03
2003/0058130 A1 * 3/2003 Kramer ................... F42B 39/14
                                                    340/870.07
(Continued)

FOREIGN PATENT DOCUMENTS

DE    10 2013 108822 A1    2/2015
WO    WO 2011/072372 A1    6/2011

OTHER PUBLICATIONS

Hennig, DE 102013108822, machine translation retrieved from Espacenet.com on Jun. 20, 2018, pp. 1-17.*
(Continued)

*Primary Examiner* — Paultep Savusdiphol
(74) *Attorney, Agent, or Firm* — Buchanan Ingersoll & Rooney PC

(57) ABSTRACT

In a method of carrying a munition on a munition launcher platform, the munition launcher platform is provided with a data tag activator and a data tag reader. A munition is attached to the munition launcher platform, the munition being provided with a data tag. An activation signal is transmitted from the data tag activator to the data tag. As a result of receiving the activation signal, the data tag returns a data response to the data tag reader. The receiving of the data response provides the munition launcher platform with an indication that the munition is still attached to the munition launcher platform.

20 Claims, 1 Drawing Sheet

(51) Int. Cl.
*F41F 3/065* (2006.01)
*G05B 19/12* (2006.01)
*G06K 17/00* (2006.01)
*B63G 3/04* (2006.01)
*F41F 3/06* (2006.01)
*F41F 3/07* (2006.01)
*G06K 7/10* (2006.01)

(52) U.S. Cl.
CPC ............ *G06K 17/0022* (2013.01); *B63G 3/04* (2013.01); *F41F 3/0406* (2013.01); *F41F 3/06* (2013.01); *F41F 3/07* (2013.01); *G05B 2219/23189* (2013.01); *G06K 7/10297* (2013.01); *G06K 7/10425* (2013.01)

(58) Field of Classification Search
USPC .......................................... 235/375, 385, 492
See application file for complete search history.

(56) References Cited

U.S. PATENT DOCUMENTS

| | | | |
|---|---|---|---|
| 2006/0284727 A1 | 12/2006 | Steinke | |
| 2011/0297744 A1* | 12/2011 | Schneider | F41G 1/467 235/414 |
| 2012/0060672 A1* | 3/2012 | Grigg | F41F 3/055 89/1.8 |

OTHER PUBLICATIONS

International Search Report (PCT/ISA/210) dated Jul. 21, 2016, by the European Patent Office as the International Searching Authority for International Application No. PCT/GB2016/051468.

Written Opinion (PCT/ISA/237) dated Jul. 21, 2016, by the European Patent Office as the International Searching Authority for International Application No. PCT/GB2016/051468.

International Preliminary Report on Patentability (Chapter I of the Patent Cooperation Treaty) (PCT Rule 44bis) (PCT/IB/373) dated Nov. 28, 2017, by the International Bureau of WIPO for International Application No. PCT/GB2016/051468.

* cited by examiner

CARRYING A MUNITION ON A MUNITION LAUNCHER PLATFORM

FIELD OF THE INVENTION

This invention relates to the field of carrying a munition, such as a bomb or a missile, on a munition launcher platform. The invention also concerns a munition, a munition launcher platform and a munition launcher platform and an attached munition.

BACKGROUND ART

It is important for a munition launcher (for example, an aircraft—including UAVs and helicopters) launcher, ship, for example submarine, launcher or automotive, for example a truck, launcher) to know when a munition is attached to it. In particular, it is important to know when the munition has been released and is separated from the launcher platform. It is also possible for a smaller (child) munition to be released from a larger (parent) munition. In this case, the larger munition is the munition launcher platform for the smaller munition.

This has previously been achieved by the use of a wire electrically connecting the munition and munition launcher platform. When the electrical connection is broken, this is an indication that the munition is no longer attached.

There are a number of disadvantages of this system. Firstly, the wire can be sheared out, especially during a "rail launch" or "canister launch" from the munition launcher platform. This can lead to damage to the munition, munition launcher platform or munition launcher or failure of the system. It is also noted that a different wire arrangement may be needed for each different type of launch platform system. For example, a different wire setup is required for a rail launch or canister launch as opposed to an ejection ram launch method. This means that, depending on the launcher platform used, the munition needs to be supplied with a specific wire arrangement. Another disadvantage is that the wire system requires a physical electrical continuity in order to work.

In addition, a munition launcher platform may need to be informed of the type of munition that it is connected to. This is traditionally done by measuring voltage levels between certain points and by using discrete logic/look up tables. However, this requires the munition to be powered.

The present invention seeks to mitigate the above-mentioned problems. Alternatively or additionally, the present invention seeks to provide improved methods of carrying a munition on a munition launcher platform.

DISCLOSURE OF THE INVENTION

The present invention provides, according to a first aspect, a method of carrying a munition on a munition launcher platform comprising the follow steps providing the munition launcher platform with an data tag activator and an data tag reader, attaching a munition to the munition launcher platform, the munition being provided with an data tag, transmitting an activation signal from the data tag activator to the data tag, such that, as a result of receiving the activation signal, the data tag returns an data response to the data tag reader, the receiving of the data response providing the munition launcher platform with an indication that the munition is still attached to the munition launcher platform.

By providing an data tag activator/reader combination on the munition launcher platform and an data tag on the munition, this allows an activation signal from the munition launcher platform to activate an data response to be returned from the munition (if the data tag is close enough to—i.e. within range of—the data tag activator). This data response can be read by the data tag reader (if the data tag reader is close enough to—i.e. within range of—the data tag). Hence, the receiving of the data response by the data tag reader is an indication that the munition is within a certain range of the munition launcher platform and therefore is an indication that the munition is attached to the munition launcher platform.

The data response may be a new signal transmitted (on an active data tag) or may be a reflection of the activation signal (on a passive data tag). The reflected response may be changed in some way from the original activation signal. For example, an antennae circuit of the data tag may vary from high impedance to low impedance (for example by switching a load resistor in and out of the circuit) and thus vary the amount of activation signal that is received at different times. This is called "backscatter coupling" of the data tag and data tag reader. A skilled person would be aware of other coupling methods, such as "capacitive coupling" and "inductive coupling". The coupling can be used to send data from the data tag to the data tag reader.

The munition may be a missile.

The data tag on the munition may be powered. For example, it could be a battery powered radio beacon. However, preferably, the data tag is unpowered and is an RF data tag. An RF data tag is inductively powered. The RF data tag may be a NFC (Near Field Comms) tag.

More than one data tag may be provided on the munition. More than one data tag activator and more than one data tag reader may be provided on the munition launcher platform.

The same data tag activator and/or data tag reader on a munition launcher platform may be used to interact with a number of data tags on different munitions.

Preferably, the data response received by the data tag reader indicates ID data of the munition attached to the munition launcher platform and the method further comprises the step of using the ID data to ascertain one or more launch parameters that the munition launcher platform is to apply in launching the munition. This allows the launch process of the munition to be simpler. In addition, it prevents the wrong launch parameters being used by the munition launcher platform.

The present invention provides, according to a second aspect, a method of carrying a munition on a munition launcher platform comprising the follow steps providing the munition launcher platform with an data tag, attaching a munition to the munition launcher platform, the munition being provided with an data tag activator and an data tag reader, transmitting an activation signal from the data tag activator to the data tag, such that, as a result of receiving the activation signal, the data tag returns an data response to the data tag reader, the receiving of the data response providing the munition with an indication that the munition is still attached to the munition launcher platform.

The data response may be a new signal transmitted (on an active data tag) or may be a reflection of the activation signal (on a passive data tag). The reflected response may be changed in some way from the original activation signal. For example, an antennae circuit of the data tag may vary from high impedance to low impedance (for example by switching a load resistor in and out of the circuit) and thus vary the amount of activation signal that is received at different times. This is called "backscatter coupling" of the data tag and data tag reader. A skilled person would be aware of other coupling methods, such as "capacitive coupling" and "inductive coupling". The coupling can be used to send data from the data tag to the data tag reader.

The munition may be a missile.

The data tag on the munition launcher platform may be powered. For example, it could be a battery powered radio beacon. However, preferably, the data tag is unpowered and is an RF data tag. An RF data tag is inductively powered. The RF data tag may be a NFC (Near Field Comms) tag.

More than one data tag may be provided on the munition launcher platform. More than one data tag activator and more than one data tag reader may be provided on the munition.

Preferably, the data response received by the data tag reader indicates ID data of the munition launcher platform and the method further comprises the step of using the ID data to ascertain one or more launch parameters that the munition is to apply prior to its launch from the munition launcher platform. This allows the launch process of the munition to be simpler. In addition, it prevents the wrong launch parameters being used by the munition.

The present invention provides, according to a third aspect, a munition wherein the munition is provided with an data tag, capable of returning an data response upon activation by an activation signal received from an data tag activator, or an data tag activator, capable of transmitting an activation signal to an data tag, and an data tag reader, capable of receiving an data response from the data tag.

The data response may be a new signal transmitted (on an active data tag) or may be a reflection of the activation signal (on a passive data tag). The reflected response may be changed in some way from the original activation signal. For example, an antennae circuit of the data tag may vary from high impedance to low impedance (for example by switching a load resistor in and out of the circuit) and thus vary the amount of activation signal that is received at different times. This is called "backscatter coupling" of the data tag and data tag reader. A skilled person would be aware of other coupling methods, such as "capacitive coupling" and "inductive coupling". The coupling can be used to send data from the data tag to the data tag reader.

The munition may be a missile.

The data tag that may be provided on the munition launcher platform may be powered. For example, it could be a battery powered radio beacon. However, preferably, the data tag is unpowered and is an RF data tag. An RF data tag is inductively powered. The RF data tag may be a NFC (Near Field Comms) tag.

More than one data tag may be provided on the munition. More than one data tag activator and more than one data tag reader may be provided on the munition. For example, there may be a data tag towards each end of a munition.

Preferably, the munition is provided with a Radio Frequency Identification (RF data) tag, capable of returning the data response upon activation by the activation signal received from an RF data tag activator, or an RF data tag activator, capable of transmitting the activation signal to an RF data tag, and an RF data tag reader, capable of receiving the data response from an RF data tag.

Preferably, the munition is provided with the (RF) data tag. The (RF) data tag is designed to interact with an (RF) data tag activator and (RF) data tag reader on a munition launcher platform. Alternatively, or additionally, the munition may be provided with an (RF) data tag activator, capable of transmitting an activation signal to an (RF) data tag, and an (RF) data tag reader, capable of receiving an (RF) data response from the (RF) data tag.

The present invention provides, according to a fourth aspect, a munition launcher platform wherein the munition launcher platform is provided with an data tag activator, capable of transmitting an activation signal to an data tag, and an data tag reader, capable of receiving an data response from the data tag, or an data tag, capable of returning an data response upon activation by an activation signal received from an data tag activator.

The data response may be a new signal transmitted (on an active data tag) or may be a reflection of the activation signal (on a passive data tag). The reflected response may be changed in some way from the original activation signal. For example, an antennae circuit of the data tag may vary from high impedance to low impedance (for example by switching a load resistor in and out of the circuit) and thus vary the amount of activation signal that is received at different times. This is called "backscatter coupling" of the data tag and data tag reader. A skilled person would be aware of other coupling methods, such as "capacitive coupling" and "inductive coupling". The coupling can be used to send data from the data tag to the data tag reader.

The data tag that may be provided on the munition launcher platform may be powered. For example, it could be a battery powered radio beacon. However, preferably, the data tag is unpowered and is an RF data tag. An RF data tag is inductively powered. The RF data tag may be a NFC (Near Field Comms) tag.

More than one data tag may be provided on the munition launcher platform. More than one data tag activator and more than one data tag reader may be provided on the munition launcher platform. For example, there may be a data tag activator/reader combination towards each end of a munition attachment section, to correspond to each end of an attached munition.

Preferably, the munition launcher platform is provided with an RF data tag activator, capable of transmitting the activation signal to an RF data tag, and an RF data tag reader, capable of receiving the data response from an RF data tag, or a Radio Frequency Identification (RF data) tag, capable of returning the data response upon activation by the activation signal received from an RF data tag activator.

Preferably, the munition launcher platform is provided with the (RF) data tag activator and the (RF) data tag reader. The (RF) data tag activator and (RF) data tag reader are designed to interact with an (RF) data tag on a munition. Alternatively, or additionally, the munition launcher platform may be provided with an (RF) data tag capable of returning the (RF) data response upon activation by an activation signal received from an (RF) data tag activator.

Preferably, the activation signal to be received/transmitted is within a pre-specified range of frequencies. This prevents tampering.

Preferably, the data response to be returned contains a data string that indicates information about said munition or munition launcher platform.

In other words, the data response may be modulated. The data tag may be pre-programmed with the data string during manufacture, during testing or by authorised personnel prior to attaching the munition to the munition launcher platform.

The data string may be a continuous string of data.

The data string may contain information about the munition such as the age of the munition, its number of flight hours, number of uses and munition type.

The data string may contain information about the munition launcher platform such as the number of uses of the launcher platform and the launcher platform type. For example, rail launch, canister launch, ejection ram launch. It may also indicate the launcher that the launcher platform is attached to, for example, on a ship, truck or aircraft launcher.

The information contained in the data string may be reported back to maintenance/logistics personnel to aid in maintenance etc. decisions for the munition or munition launcher platforms.

Preferably, the data response returned indicates one or more launch characteristics required by the munition. This allows the launch process of the munition to be simpler. In addition, it prevents the wrong launch characteristics being used by the munition launcher platform. The launch characteristics may include the launch profile/voltage/current/power draw, the mass of the munition, the seeker/guidance type of the munition, data type or the safety settings.

Preferably, the data response received indicates one or more launch characteristics required to be provided by the munition launcher platform. This allows the launch process of the munition to be simpler. In addition, it prevents the wrong launch characteristics being used by the munition. For example, the munition may be able to set itself for launch based on the launch characteristics required by the munition launcher platform. The launch characteristics may include the type of launcher platform e.g. rail launch, canister launch or ejection ram launch.

The data response may indicate an index or code for the munition/munition launcher platform so that the launch characteristics can be looked up, for example from a database on the munition launcher platform/munition.

Preferably, the (RF) data tag reader is arranged such that receipt of a data response generates a connection signal, the connection signal being an indication that the munition/munition launcher platform is connected to a munition launcher platform/munition.

Preferably, the (RF) data tag reader is arranged such that non-receipt of an expected data response generates a non-connection signal, the non-connection signal being an indication that the munition/munition launcher platform is not connected to a munition launcher platform/munition.

Preferably, the (RF) data tag activator is arranged to transmit the activation signal periodically and wherein the (RF) data tag reader is arranged to expect to receive a corresponding periodic data response and wherein the (RF) data tag reader is arranged such that non-receipt of one or more expected data responses, following transmission of one or more activation signals by the (RF) data tag activator, generates a non-connection signal, the non-connection signal being an indication that the munition/munition launcher platform is not connected to a munition launcher platform/munition. This allows a periodic assessment of the connection/non-connection of the munition. For example, the periodic frequency could be 50 times a second.

A non-connection signal may be an indication (if there are a number of non-connection signals in a row) that the munition is moving in relation to the munition launcher platform so that the data tag is not within range of the data tag activator and/or data tag reader (bouncing in and out of range, for example). It could also be an indication of tampering. The system may be placed in an "unsafe" state if there is a long gap between connection signals.

Preferably, the data response received/returned is encrypted.

Preferably, the munition/munition launcher platform is provided with a decryption device for decrypting the data response received.

The data tag may be a secure tag that scrutinizes the inductive filed of the data tag activator/reader.

The present invention provides, according to a fifth aspect, a munition launcher platform and an attached munition, wherein one of the munition or munition launcher platform is provided with an data tag activator, capable of transmitting an activation signal to an data tag, and an data tag reader, capable of receiving an data response from the data tag, and the other of the munition and munition launcher platform is provided with an data tag, capable of returning an data response upon activation by an activation signal received from the RF data tag activator.

Preferably, the range of the data tag reader is similar to the distance of the data tag from the data tag reader. This prevents tampering. For example, the range of the data tag reader may be only 120% of its distance from the data tag. For example, the range of the data tag reader may be 2 cm to 5 m.

Preferably, the range of the data tag activator is similar to the distance of the data tag from the data tag activator. This prevents tampering. For example, the range of the data tag activator may be only 120% of its distance from the data tag. For example, the range of the data tag activator may be 2 cm to 5 m.

Preferably, the range of the data tag is similar to the distance of the data tag from the data tag reader. This prevents tampering. For example, the range of the data tag may be only 120% of its distance from the data tag reader. For example, the range of the data tag may be 2 cm to 5 m.

The frequency of the activation signal may be the same or different to the frequency of the data response. For example, an "active" data tag can transmit a new data signal at a different frequency to the activation signal. On the other hand, a "passive" data tag will reflect back the activation signal (so the data response has the same data as the activation signal).

Preferably, the munition launcher platform is provided with the data tag activator and the data tag reader and the munition is provided with an data tag, wherein the munition launcher platform is arranged to provide power to the munition only when the data tag reader receives an expected data response from the data tag. This prevents tampering.

It will of course be appreciated that features described in relation to one aspect of the present invention may be incorporated into other aspects of the present invention. For example, the method of the invention may incorporate any of the features described with reference to the apparatus of the invention and vice versa.

BRIEF DESCRIPTION OF THE DRAWINGS

Embodiments of the present invention will now be described by way of example only with reference to the accompanying schematic drawings of which.

DETAILED DESCRIPTION

Figure 1:
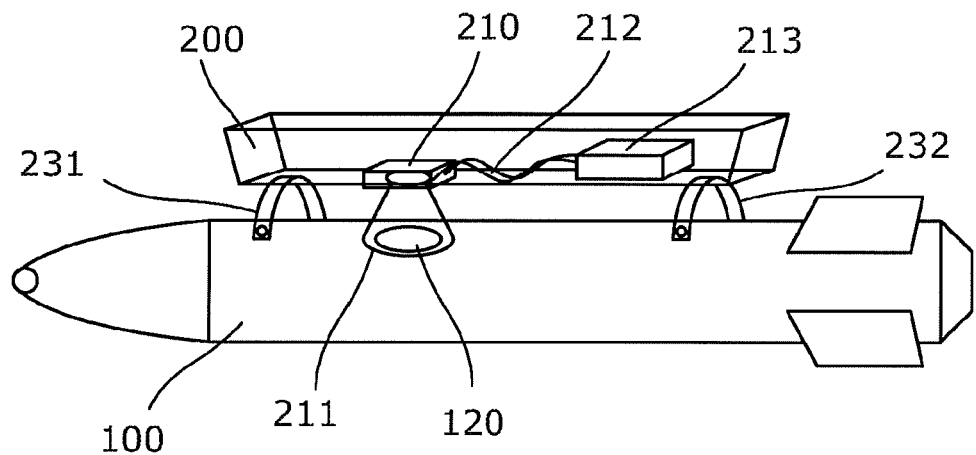
FIG. 1 shows a side view of a missile and missile launcher platform combination according to a first embodiment of the invention.

FIG. 1 shows a side view of a missile 100 and missile launcher platform 200 combination according to a first embodiment of the invention. The missile 100 is attached to the launcher platform 200 by arcuate hangers 231 and 232 towards either end of the launcher platform 200. (The skilled person will know that munitions can be held in many ways.

A typical rail is one solid bar on an aircraft or other launcher and three different shaped hangers on the munition. An ejection ram normally has two points of hold so that the munition can be kept at a particular attitude on ejection. However, many different arrangements are possible).

The missile 100 is provided with an active RFID tag 120.

The missile launcher platform 200 is provided with an RFID tag activator and reader 210. The RFID tag activator and reader 210 is aligned with the RFID tag 120 in this attached position of the missile 100. The range 211 of the RFID tag activator and reader 210 is slightly more than the distance between the RFID tag 120 and the RFID tag activator and reader 210. The RFID tag activator and reader 210 is connected by wires 212 to an internal computer 213 of the missile launcher platform 200.

In use, RFID tag activator and reader 210 is set to send a periodic activation signal at a certain frequency. It may be set directly or by the internal computer 213. When, and if, the RFID tag 120 receives this signal, it is induced to send an encrypted ID signal at a certain frequency. This frequency may be the same or different to the activation signal frequency.

The ID signal is read by the RFID tag activator and reader 210 and this information is fed by wires 212 to the internal computer 213.

The ID signal contains data about the missile 100, including such as the age of the missile, its number of flight hours, number of uses and missile type. It also includes launch characteristics required by the missile, such as launch profile/voltage/current/power draw, the mass of the missile, the seeker/guidance type of the missile, data type or the safety settings.

Alternatively, the ID signal may indicate an index or code for the missile 100 so that the launch characteristics etc. can be looked up, for example from a database in the internal computer 213 of the missile launcher platform 200.

The missile launcher platform 200 is provided with a decryption device for decrypting the ID signal received by the RFID tag activator and reader 210.

The missile launcher platform 200 uses the information about the missile 100 to set the launch parameters that the missile launcher platform is to apply in launching the missile, when required.

The information contained in the ID signal may be later reported back to maintenance/logistics personnel, through the internal computer 213, to aid in maintenance etc. decisions for the missile.

When each ID signal is read by the RFID tag activator and reader 210, this generates a connection signal in the internal computer 213. The connection signal is an indication that the missile 100 is connected to a missile launcher platform 200.

When an ID signal is not received (after the activation signal has been transmitted), the non-receipt of an expected ID signal generates a non-connection signal in the internal computer 213. The non-connection signal is an indication that the missile 100 is not connected to a missile launcher platform 200.

The missile launcher platform 200 is arranged to provide power to the missile (for example, for launch) only when the RFID tag activator and reader 210 receives an expected ID signal from the ID tag 120.

Figure 2:
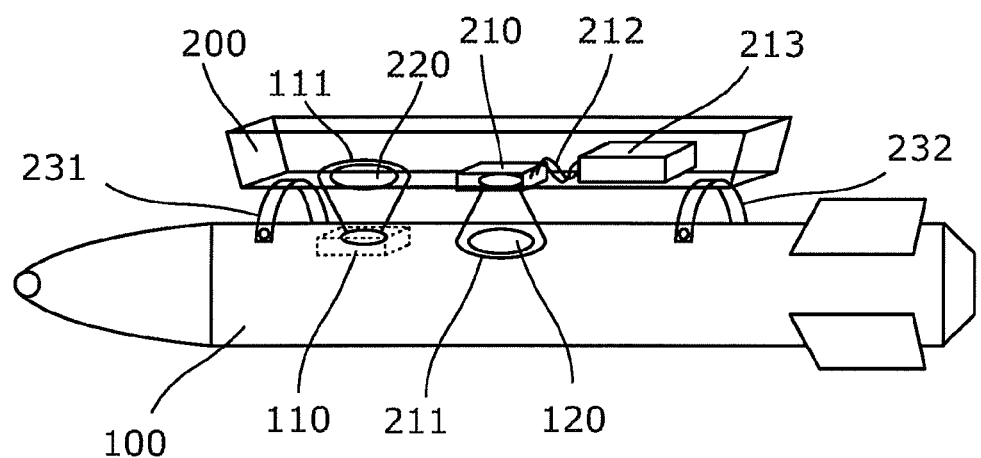
FIG. 2 shows a side view of a missile and missile launcher platform combination according to a second embodiment of the invention.

FIG. 2 shows a side view of a missile 100 and missile launcher platform 200 combination according to a second embodiment of the invention. The same numbering is used as for the same features of FIG. 1, with additional features being given new numbers 110, 111 and 220, which are described below.

The missile 100 is additionally provided with an RFID tag activator and reader 110, similar to the RFID tag activator and reader 210 on the missile launcher platform 200.

The missile launcher platform is additionally provided with an active RFID tag 220, similar to the active RFID tag on the missile 100.

The RFID tag activator and reader 110 is aligned with the RFID tag 220 in this attached position of the missile 100. The RFID tag activator and reader 110 of the missile 100 has a range 111 slightly more than the distance between the RFID tag 220 on the missile launcher platform 200 and the RFID tag activator and reader 110 on the missile.

In use, like RFID tag activator and reader 210, RFID tag activator and reader 110 on the missile 100 is set to send a periodic activation signal at a certain frequency. When, and if, the RFID tag 220 on the missile launcher platform 200 receives this signal, it is induced to send an encrypted ID signal at a certain frequency. This frequency may be the same or different to the activation signal frequency.

The ID signal is read by the RFID tag activator and reader 110.

The ID signal contains data about the missile launcher platform 200, including the number of uses of the launcher platform and the launcher type. For example, rail launch, canister launch, ejection ram launch and whether the launcher platform is on a ship, truck or aircraft.

Alternatively, the ID signal may indicate an index or code for the missile launcher platform 200 so that the launch characteristics etc. can be looked up by the missile 100.

The missile 100 is provided with a decryption device for decrypting the ID signal received by the RFID tag activator and reader 110.

The missile 100 uses the information about the missile launcher platform 200 to set launch parameters of the missile during launch, when required.

The information contained in the ID signal may be later reported back to maintenance/logistics personnel, to aid in maintenance etc. decisions for the missile launcher platform 200.

When each ID signal is read by the RFID tag activator and reader 110, this generates a connection signal. The connection signal is an indication that the missile launcher platform 200 is connected to a missile 100.

When an ID signal is not received (after the activation signal has been transmitted), the non-receipt of an expected ID signal generates a non-connection signal. The non-connection signal is an indication that the missile launcher platform 200 is not connected to a missile 100.

Whilst the present invention has been described and illustrated with reference to particular embodiments, it will be appreciated by those of ordinary skill in the art that the invention lends itself to many different variations not specifically illustrated herein. By way of example only, certain possible variations have been described above.

Another variation is that the tags used could be "passive", rather than "active" tags. Also, they may be data tags that have a data response to return, rather than an ID tag with an ID data response to return.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of carrying a munition on a munition launcher platform, the method comprising:
   providing the munition launcher platform with a data tag;
   attaching a munition to the munition launcher platform, the munition being provided with a data tag activator and a data tag reader;
   transmitting an activation signal from the data tag activator to the data tag, such that, as a result of receiving the activation signal, the data tag returns a data response to the data tag reader indicating ID data of the munition launcher platform, the receiving of the data response providing the munition with an indication that the munition is still attached to the munition launcher platform; and
   using the ID data of the munition launcher platform to ascertain one or more launch parameters that the munition is to apply prior to its launch from the munition launcher platform.

2. A munition comprising a data tag activator, configured for transmitting an activation signal to a data tag on a munition launcher platform, and a data tag reader, configured for receiving a data response from the data tag, wherein the data response received indicates one or more launch characteristics required by the munition.

3. A munition as claimed in claim 2, wherein the munition comprises
   an RF data tag activator, configured for transmitting the activation signal to an RF data tag, and an RF data tag reader, configured for receiving the data response from an RF data tag.

4. A munition as claimed in claim 2, wherein the activation signal to be received/transmitted is within a pre-specified range of frequencies.

5. A munition as claimed in claim 2, in combination with a munition launcher platform, wherein the (RF) data tag reader is configured such that receipt of a data response generates a connection signal, the connection signal being an indication that the munition is connected to the munition launcher platform.

6. A munition as claimed in claim 5, wherein the (RF) data tag reader is configured such that non-receipt of an expected data response generates a non-connection signal, the non-connection signal being an indication that the munition is not connected to the munition launcher platform.

7. A munition as claimed in claim 5, wherein the (RF) data tag activator is configured to transmit the activation signal periodically and wherein the (RF) data tag reader is configured to expect to receive a corresponding periodic data response and wherein the (RF) data tag reader is configured such that non-receipt of one or more expected data responses, following transmission of one or more activation signals by the (RF) data tag activator, generates a non-connection signal, the non-connection signal being an indication that the munition is not connected to a munition launcher platform.

8. A munition as claimed in claim 7, wherein the data response received/returned is encrypted.

9. A munition as claimed in claim 8, wherein the munition is provided with a decryption device for decrypting the data response received.

10. A munition launcher platform comprising a data tag, configured for returning a data response upon activation by an activation signal received from a data tag activator on a munition, wherein the data response to be returned contains a data string that indicates information about said munition launcher platform.

11. A munition launcher platform as claimed in claim 10, wherein the munition launcher platform is provided with
    a Radio Frequency Identification (RF data) tag, configured for returning the data response upon activation by the activation signal received from an RF data tag activator.

12. A munition launcher platform as claimed in claim 10, in combination with a munition, wherein the (RF) data tag reader is configured such that receipt of a data response generates a connection signal, the connection signal being an indication that the munition is connected to the munition launcher platform.

13. A combination of a munition launcher platform and a munition as claimed in claim 12, wherein the (RF) data tag reader is configured such that non-receipt of an expected data response generates a non-connection signal, the non-connection signal being an indication that the munition is not connected to the munition launcher platform.

14. A combination of a munition launcher platform and a munition as claimed in claim 12, wherein the (RF) data tag activator is configured to transmit the activation signal periodically and wherein the (RF) data tag reader is configured to expect to receive a corresponding periodic data response and wherein the (RF) data tag reader is configured such that non-receipt of one or more expected data responses, following transmission of one or more activation signals by the (RF) data tag activator, generates a non-connection signal, the non-connection signal being an indication that the munition is not connected to a munition launcher platform.

15. A combination of a munition launcher platform and a munition as claimed in claim 14, wherein the data response received/returned is encrypted.

16. A combination of a munition launcher platform and a munition as claimed in claim 15, wherein the munition is provided with a decryption device for decrypting the data response received.

17. A munition launcher platform as claimed in claim 10, wherein the activation signal to be received/transmitted is within a pre-specified range of frequencies.

18. A munition launcher platform and an attached munition, wherein the munition comprises
    a data tag activator, transmitting an activation signal to a data tag, and a data tag reader configured for receiving a data response from the data tag, and
    the munition launcher platform is provided with a data tag configured for returning a data response upon activation by an activation signal received from the data tag activator,
    wherein the data response to be returned contains a data string that indicates information about said munition launcher platform, and
    wherein the data response to be returned indicates one or more launch characteristics to be applied.

19. A munition launcher platform and an attached munition as claimed in claim 18, wherein a range of the data tag reader is similar to a distance of the data tag from the data tag reader.

20. A munition launcher platform and an attached munition as claimed in claim 19, wherein a range of the data tag activator is similar to a distance of the data tag from the data tag activator.

\* \* \* \* \*